(12) United States Patent
Watanabe et al.

(10) Patent No.: US 10,618,331 B2
(45) Date of Patent: Apr. 14, 2020

(54) INK SET AND IMAGE FORMING DEVICE

(71) Applicants: Takashi Watanabe, Kanagawa (JP); Taku Hatakeyama, Kanagawa (JP); Kaoru Tadokoro, Kanagawa (JP); Sho Oyamatsu, Tokyo (JP); Tomohiro Inoue, Kanagawa (JP); Hiroshi Gotou, Kanagawa (JP); Mio Kumai, Tokyo (JP)

(72) Inventors: Takashi Watanabe, Kanagawa (JP); Taku Hatakeyama, Kanagawa (JP); Kaoru Tadokoro, Kanagawa (JP); Sho Oyamatsu, Tokyo (JP); Tomohiro Inoue, Kanagawa (JP); Hiroshi Gotou, Kanagawa (JP); Mio Kumai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/293,694

(22) Filed: Mar. 6, 2019

(65) Prior Publication Data
US 2019/0275818 A1 Sep. 12, 2019

(30) Foreign Application Priority Data

Mar. 8, 2018 (JP) .................................. 2018-041502
Dec. 28, 2018 (JP) .................................. 2018-247129

(51) Int. Cl.
B41M 5/00 (2006.01)
C09D 11/033 (2014.01)
(Continued)

(52) U.S. Cl.
CPC ............ B41M 5/0023 (2013.01); B41J 2/155 (2013.01); B41J 2/16535 (2013.01);
(Continued)

(58) Field of Classification Search
CPC ..... C09D 11/40; C09D 11/033; C09D 11/322; C09D 11/30; B41J 2/135
(Continued)

(56) References Cited

U.S. PATENT DOCUMENTS 8,128,199 B2 * 3/2012 Osaki ................... B41J 2/14072
347/20
8,348,411 B2 * 1/2013 Brust ..................... C09D 11/38
106/31.13
(Continued)

FOREIGN PATENT DOCUMENTS

JP 2002-338858 11/2002
JP 2009-202370 9/2009
(Continued)

Primary Examiner — An H Do
(74) Attorney, Agent, or Firm — Oblon, McClelland, Maier & Neustadt, L.L.P.

(57) ABSTRACT

An ink set comprises black ink having a static surface tension A and yellow ink having a static surface tension B, wherein the static surface tension A is by 0.6 mN/m or more greater than the static surface tension B, wherein the ink set is used in an image forming device including an inkjet head including a nozzle plate including a first nozzle array and a second nozzle array disposed adjacent to the first nozzle array, the first nozzle array including multiple first nozzles configured to discharge the black ink and a second nozzle array including multiple second nozzles configured to discharge the yellow ink, wherein each nozzle of the multiple first nozzles and the multiple second nozzles has a cylindrical portion having a length of 25 μm or longer along an axial direction with an opening on an ink discharging side of the nozzle plate.

15 Claims, 7 Drawing Sheets

(51) Int. Cl.
*C09D 11/40* (2014.01)
*B41J 2/155* (2006.01)
*B41J 2/21* (2006.01)
*B41J 2/165* (2006.01)

(52) U.S. Cl.
CPC .......... *B41J 2/2103* (2013.01); *C09D 11/033* (2013.01); *C09D 11/40* (2013.01); *B41J 2002/1655* (2013.01); *B41J 2002/16558* (2013.01)

(58) Field of Classification Search
USPC ................................ 347/43, 45, 47, 95, 100
See application file for complete search history.

(56) References Cited

U.S. PATENT DOCUMENTS

| | | | |
|---|---|---|---|
| 2005/0099457 A1* | 5/2005 | Mataki | B41J 2/04571 347/47 |
| 2015/0035896 A1 | 2/2015 | Gotou et al. | |
| 2015/0077480 A1 | 3/2015 | Fujii et al. | |
| 2015/0079358 A1 | 3/2015 | Gotou et al. | |
| 2015/0103116 A1 | 4/2015 | Gotou | |
| 2015/0307729 A1 | 10/2015 | Gotou et al. | |
| 2016/0333208 A1 | 11/2016 | Gotou et al. | |
| 2017/0009092 A1 | 1/2017 | Gotou et al. | |
| 2017/0022381 A1 | 1/2017 | Takamura et al. | |
| 2017/0182770 A1 | 6/2017 | Gotou | |
| 2018/0030292 A1 | 2/2018 | Gotou et al. | |

FOREIGN PATENT DOCUMENTS

| | | |
|---|---|---|
| JP | 2015-061765 | 4/2015 |
| JP | 2015-193082 | 11/2015 |
| JP | 2018-069453 | 5/2018 |

\* cited by examiner

INK SET AND IMAGE FORMING DEVICE

CROSS-REFERENCE TO RELATED APPLICATIONS

This patent application is based on and claims priority pursuant to 35 U.S.C. § 119 to Japanese Patent Application Nos. 2018-041502 and 2018-247129, filed on Mar. 8, 2018 and Dec. 28, 2018, respectively, in the Japan Patent Office, the entire disclosures of which are hereby incorporated by reference herein.

BACKGROUND

The present invention relates to an ink set and an image forming device.

Description of the Related Art

Consumer demand for printed matter diversity is increasing. Therefore, a recording method employing an inkjet method capable of on-demand full-color printing is appealing. For full-color printing, image forming devices are required to have nozzles to discharge different color inks.

SUMMARY

According to the present invention, provided is an improved ink set which comprises black ink having a static surface tension A and yellow ink having a static surface tension B, wherein the static surface tension A is by 0.6 mN/m or more greater than the static surface tension B, wherein the ink set is used in an image forming device including an inkjet head including a nozzle plate including a first nozzle array and a second nozzle array disposed adjacent to the first nozzle array, the first nozzle array including multiple first nozzles configured to discharge the black ink and a second nozzle array including multiple second nozzles configured to discharge the yellow ink, wherein each nozzle of the multiple first nozzles and the multiple second nozzles has a cylindrical portion having a length of 25 μm or longer along an axial direction with an opening on an ink discharging side of the nozzle plate.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
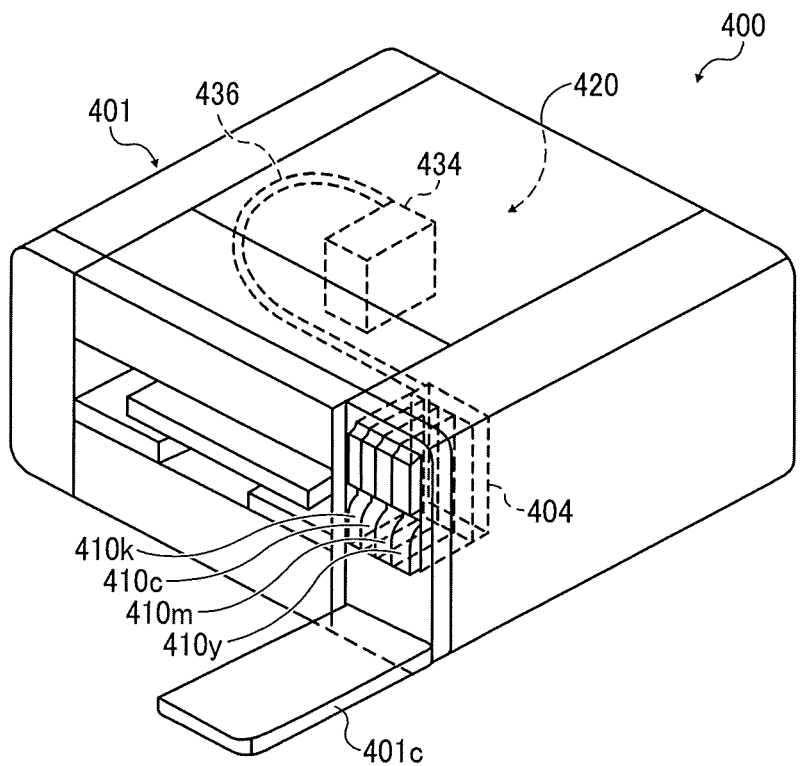
FIG. 1 is a diagram of a perspective view illustrating an example of a serial type image forming device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

A liquid discharging device has been proposed which has nozzle arrays disposed adjacent to each other on a nozzle surface to prevent different fluids from being mixed by applying a pressure to the fluids being supplied to the nozzles during wiping of the nozzle surface.

However, upon the application of a pressure to the ink as the fluid, the ink flows out when wiping the nozzle surface and adheres to the wiping member, which increases the amount of ink consumption and contaminates the nozzle surface due to contamination of the wiping member.

In addition, to prevent variation of the ink droplet discharging direction, an image forming device has been proposed which includes an inkjet head including a nozzle having a long cylindrical portion with an opening on the ink discharging side of a nozzle plate along the axial direction. However, this causes ink mixing in particular when cleaning the discharging surface of the head.

According to the present disclosure, an ink set is provided which demonstrates excellent ink discharging properties even for an inkjet head in which nozzle arrays are disposed adjacent to each other to discharge inks having different luminosity through nozzles having a long cylindrical portion in the axial direction.

Ink Set The ink set of the present disclosure contains multi-color inks, i.e., at least two different color inks. The different color inks contain a dark color ink and a light color.

In the present disclosure, the dark color and the light color are defined by the luminosity (L*) of CIE L*a*b* color coordinate.

As the ink for use in an image forming device, four color inks of black (K), yellow (Y), magenta (M), and cyan (C) are preferably used. The luminosity of the four color inks are normally lighter (brighter) from black to cyan to magenta to yellow.

In the present disclosure, in particular, an ink set of yellow ink as the light color ink and black ink as the dark color ink is preferable.

In addition to these colors, inks of other arbitrary color such as white, metallic, light cyan, light yellow, light magenta, red, orange, green, and violet can be used. Any combination of two colors, for example, yellow and cyan and magenta and black can be selected. As the luminosity difference between the two colors increases, color mixing becomes serious so that the present disclosure has a better impact.

In the present disclosure, the luminosity means L* of CIE L*a*b* color coordinate and the luminosity (L*) of the ink is determined by measuring solid images formed under the same condition by a spectrophotometric densitometer (X-Rite 938, manufactured by X-Rite Inc.).

The ink set of the present disclosure contains a dark color ink having a static surface tension A and a light color ink having a static surface tension B. The static surface tension A is by 0.6 mN/m or more greater than the static surface tension B. Due to this, in an image forming device including an inkjet head (hereinafter also referred to as head or discharging head) having a nozzle plate having a first nozzle array and a second nozzle array disposed adjacent to the first nozzle array, the first nozzle array including multiple first nozzles to discharge the dark color ink and a second nozzle array including multiple second nozzles to discharge the light color ink, each nozzle of the multiple first nozzles and the multiple second nozzles having a cylindrical portion having a length of 25 μm or longer along the axial direction, it is possible to prevent the dark color ink from being incorporated into the second nozzle to discharge the light color ink so that degradation of ink dischargeability causing, for example, color mixing and nozzle clogging can be avoided when the nozzle surface of the nozzle plate is wiped off by a wiping member. Similarly, the light color can be mixed with the dark color. However, degradation of ink dischargeability has an adverse impact on image quality when the dark color ink is mixed with the light color ink.

Since dirt accumulates on the nozzle surface as the ink is discharged, it is necessary to clean the nozzle surface by, for example, a wiping member. If the first nozzle array, on which the multiple first nozzles to discharge the dark color ink are disposed, and the second nozzle array, on which the multiple second nozzles to discharge the light color ink are disposed, are disposed adjacent to each other on the nozzle plate, the ink may be mixed when the nozzle surface of the nozzle plate is wiped off. This color mixing becomes serious when the dark color ink is mixed with the light color ink. In addition, when the cylindrical portion having the same diameter as the discharging aperture has a length of 25 μm or longer along the axial direction, the different color ink is taken up deep due to capillary action, which causes more serious color mixing.

If different color ink is taken up deep, idle discharging is required to recover color mixing multiple times, which lowers image forming speed. Also, if the recovery from color mixing fails, image defects occur.

The ink set of the present disclosure contains a dark color ink having a static surface tension A and a light color ink having a static surface tension B, which is by 0.6 mN/m or more less than the static surface tension A so that the ink set has an impact on prevention on the color mixing.

This is because a significant static surface tension difference tends to prevent color mixing and as the static surface tension increases, the wettability to a nozzle decreases so that the ink adhering to a wiping member is not easily re-transferred to the nozzle.

Notably, the dynamic surface tension and the static surface tension are clearly different from each other and used to evaluate different properties. In the present disclosure, static surface tension is used to evaluate the problem ascribable to wettability of ink to a nozzle.

In the present disclosure, the dark color ink in the ink set is preferably black ink and the light color ink in the ink set is preferably yellow ink. This combination of black color (having least luminosity), which is the darkest color of black, yellow, magenta, and cyan and yellow color (having highest luminosity), which is the lightest color of these causes a large problem when both colors are mixed. The present disclosure has a significant impact on color mixing of this combination.

In the ink set of the present disclosure, the static surface tension A of the dark color ink is by 0.6 mN/m or more and preferably by 0.7 mN/m or more larger than the static surface tension B of the light color ink. The static surface tension A of the dark color is larger than the static surface tension B of the light color and the upper limit of the static surface tension difference is preferably 1.2 mN/m or less and more preferably 1.0 mN/m or less.

When the static surface tension A of the dark color ink is by 0.6 mN/m or more larger than the static surface tension B of the light color ink, degradation of ink dischargeability can be suitably prevented when the nozzle surface is wiped off by a wiping member. In addition, when the static surface tension difference between different color inks is 1.2 mN/m or less, image forming and discharging control are possible in an integrated system when using the same inkjet head.

Ink

Organic solvents, water, coloring material, resins, and additives for use in the ink are described below.

Organic Solvent

There is no specific limitation to the organic solvent for use in the present disclosure. For example, water-soluble organic solvents can be used. Examples include, but are not limited to, polyols such as alkyleneglycol ether, ethers such as polyol alkylethers and polyol arylethers, nitrogen-containing heterocyclic compounds, amides, amines, and sulfur-containing compounds.

Specific examples of the polyol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl1,3-butanediol, trethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Specific examples of the polyol alkyl ethers include, but are not limited to, ethylene glycol monoethylether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, and propylene glycol monoethyl ether.

Specific examples of the polyol arylethers include, but are not limited to, ethylene glycol monophenylether and ethylene glycol monobenzylether.

Specific examples of nitrogen-containing heterocyclic compounds include, but are not limited to, 2-pyrolidone, N-methyl-2-pyrolidone, N-hydroxyethyle-2-pyrolidone, 1,3-dimethyl-2-imidazoline, ε-caprolactam, and γ-butylolactone.

Specific examples of the amide include, but are not limited to, formamide, N-methyl formamide, N,N-dimethylformamide, 3-methoxy-N,N-dimethyl propionamide, and 3-buthoxy-N,N-dimethylpropionamide.

Specific examples of the amine include, but are not limited to, monoethanol amine, diethanol amine, triethanol amine, and triethyl amine.

Specific examples of the sulfur-containing compounds include, but are not limited to, dimethyl sulphoxide, sulfolane, and thiodiethanol.

Also, for example, propylene carbonate and ethylene carbonate can be used as the organic solvent.

In particular, usage of glycerin enhances moisture property of ink, which leads to reduction of occurrence of nozzle clogging.

Polyol compounds having eight or more carbon atoms and glycol ether compounds are also suitable as the organic solvent. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, triethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance permeability of ink for paper used as a recording medium. In particular, usage of triethyleneglycol monobutylether makes wettability of ink suitable.

The proportion of the organic solvent in the ink has no particular limit and can be suitably selected to suit to a particular application.

In terms of drying property and discharging reliability of ink, the proportion is preferably from 10 to 60 percent by mass and more preferably from 20 to 60 percent by mass.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

Coloring Material

The coloring material has no particular limit. For example, pigments and dyes are usable.

As the pigment, inorganic pigments or organic pigments can be used. These can be used alone or in combination. In addition, it is possible to use a mixed crystal as the pigment.

As the pigments, for example, black pigments, yellow pigments, magenta pigments, cyan pigments, white pigments, green pigments, orange pigments, and gloss pigments and metallic pigments of gold, silver, etc., can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant. Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency in the maximum number conversion is preferably 20 to 500 nm and more preferably 20 to 150 nm to improve dispersion stability of the pigment and ameliorate discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and increasing image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Resin

The type of the resin contained in the ink has no particular limit and can be suitably selected to suit to a particular application. Examples are urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles formed of these resins may be also used. It is possible to mix a resin emulsion in which such resin particles are dispersed in water as a dispersion medium with materials such as a coloring material and an organic solvent to obtain an ink. It is possible to use suitably-synthesized resin particles. Alternatively, the resin particle is available on the market. These resin particles can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image robustness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total amount of the ink.

The particle diameter of the solid portion in the ink has no particular limit and can be selected to suit to a particular application. The maximum frequency of the particle diameter of the solid portion in the ink is preferably from 20 to 1000 nm and more preferably from 20 to 150 nm in the maximum number conversion to enhance discharging stability and image quality such as image density. The solid portion includes resin particles, particles of pigments, etc. The particle diameter can be measured by using a particle size analyzer (Nanotrac Wave-UT151, manufactured by MicrotracBEL Corp).

Additive

The ink may further optionally contain additives such as a surfactant, a defoaming agent, a preservative and fungicide, a corrosion inhibitor, and a pH regulator.

Surfactant

Examples of the surfactant are silicone-based surfactants, fluorochemical surfactants, amphoteric surfactants, nonionic surfactants, anionic surfactants, etc.

The silicone-based surfactant has no particular limit and can be suitably selected to suit to a particular application. Of these, silicone-based surfactants not decomposed even in high pH environment are preferable. The silicone-based surfactants include, for example, side chain-modified polydimethyl siloxane, both distal end-modified polydimethyl siloxane, one distal end-modified polydimethyl siloxane, and side chain both distal end-modified polydimethyl siloxane. As the modification group, it is particularly preferable to select a polyoxyethylene group or polyoxyethylene polyoxypropylene group because these demonstrate good properties as aqueous surfactants. It is possible to use a polyether-modified silicone-based surfactant as the silicone-based surfactant.

A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, a perfluoroalkyl sulfonic acid and a salt of perfluoroalkyl sulfonic acid.

Specific examples of the perfluoroalkyl carboxylic acid compounds include, but are not limited to, a perfluoroalkyl carboxylic acid and a salt of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, acetylene glycol, and adducts of acetylene alcohol with alkylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant.

Any suitably synthesized surfactant and any product available on the market is suitable. Products available on the market can be obtained from BYK-Chemie GmbH, Shin-Etsu Chemical Co., Ltd., Dow Corning Toray Co., Ltd., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

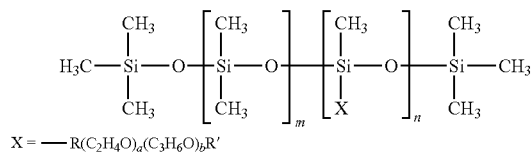

Chemical formula S-1

In Chemical formula S-1, "m", "n", "a", and "b" each, respectively independently represent integers, R represents an alkylene group, and R' represents an alkyl group.

Specific examples of polyether-moditfied silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning foray Co., Ltd.), BYK-33 and BYK-387 (both manufactured by BYK Japan KK.), and TSF4440, TSF4452, and TSF4453 (all manufactured by Momentive Performance Materials inc.).

The fluorochemical surfactant is preferably a compound having 2 to 16 fluorine-substituted carbon atoms and more preferably a compound having 4 to 16 fluorine-substituted carbon atoms.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a pertluoroalkyl ether group in its side chain. Of these, polyoxyalkylene ether polymer compounds having a perfluoroalkyl ether group in the side chain thereof are preferable because these polymer compounds do not easily foam and the fluorochemical surfactant represented by the following Chemical formula F-1 or Chemical formula F-2 is more preferable.

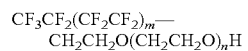

Chemical formula F-1

In the compound represented by Chemical formula F-1, m is preferably 0 or an integer of from 1 to 10 and n is preferably C or an integer of from 1 to 40.

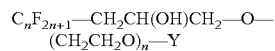

Chemical formula F-2

In the compound represented by the Chemical formula F-2, Y represents H or $C_nF_{2n+1}$, where n represents an integer of from 1 to 6, or $CH_2CH(OH)CH_2—C_nF_{2n+1}$, where n represents an integer of from 4 to 6, or $C_pH_{2p+1}$, where p is an integer of from 1 to 19. "a" represents an integer of from 4 to 14.

As the fluorochemical surfactant, products available on the market may be used. Specific examples of the products available on the market include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3 100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES). Of these, FS-3100, FS-34, and FS-300 (manufactured by The Chemours Company), FT-110, FT-250, FT-251, FT-400S, FT-150, and FT-400SW (manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, in particular coloring, and improvement on permeation to paper, wettability, and uniform dying property.

Specific examples of the nonionic surfactants include, but are not limited to, acetylene glycol compounds. As the acetylene glycol compound, acetylene glycol and an adduct of acetylene glycol with alkylene oxide. Due to inclusion of both an ether group and a hydroxy group, the acetylene glycol compound has good affinity with an ether solvent and an alcohol solvent, causing no problem as ink. In the present disclosure, usage of acetylene glycol and an adduct of acetylene glycol with alkylene oxide enhances wettability of ink to a nozzle, etc.

Specific examples of the adduct of acetylene glycol with alkylene oxide include, but are not limited to, compounds in which an alkylene oxides is adducted to acetylene glycol-based diol such as 2,5-dimethyl-3-hexine-2,5-diol, 2,5-dimethyl-2,5-hexane diol, 3,6-dimethyl-4-octine-3,6-diol, and 2,4,7,9-tetramethyl-5-desine-4,7-diol.

Acetylene glycol and an adduct of acetylene glycol with alkylene oxide are available on the market.

Specific examples of the marketed product include, but are not limited to Surfynol 104 series, Surfynol 440 series, and OLFINE® (all manufactured by Nissin Chemical co., ltd.).

In the present disclosure, the ink preferably contains an acetylene glycol compound. Inclusion of an acetylene glycol compound enhances wettability of the ink to a nozzle, thereby further improving discharging recovery.

The proportion of the surfactant in the ink is not particularly limited and can be suitably selected to suit to a particular application. For example, it is preferably from 0.001 to 5 percent by mass and more preferably from 0.05 to 5 percent by mass in terms of excellent wettability and discharging stability and improvement on image quality.

In the present disclosure, in particular, usage of an acetylene glycol compound, glycerin, and triethylene glycol monobutyl ether enhances moisturing property of ink and wettability of ink and moderate nozzle clogging and wettability of ink.

It is preferable that the black ink and the yellow ink in the ink set of the present disclosure contain an acetylene glycol compound, triethylene glycol monobutyl ether, and glycerin, and the following inequalities are satisfied:

|(proportion of the acetylene glycol compound in the black ink)–(proportion of the acetylene glycol compound in the yellow ink)|≤2 percent by mass,

|(proportion of triethylene glycol monobutyl ether in the black ink)–(proportion of triethylene glycol monobutyl ether in the yellow ink)|≤2 percent by mass, and |(proportion of glycerin in the black ink)–(proportion of glycerin in the yellow ink)|≤2 percent by mass.

In the ink set, since the respective proportion differences between the acetylene glycol compound, glycerin, and triethylene glycol monobutyl ether contained in the dark color ink and the acetylene glycol compound, glycerin, and triethylene glycol monobutyl ether contained in the light color ink are 2 percent by mass in the absolute value, ink properties are not easily modified by, for example, agglomeration and recoverability can be maintained when the inks are mixed in a nozzle. In particular, when the length of the cylindrical portion having the same diameter as the nozzle aperture is 25 µm or more along the axial direction, a large amount of the ink is taken up due to capillary action so that a large amount of inks may be mixed. Therefore, if the amount of the acetylene glycol compound and the organic solvent is significantly different between the inks, ink discharging properties significantly deteriorate.

The difference of the amount means not the difference between the total amounts of the organic solvents contained in the inks but the difference between the amounts of the acetylene glycol compounds and the organic solvents.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation.

Specific examples include, but are not limited to, acid sulfites and sodium thiosulfates.

pH Regulator

The pH regulator has no particular limit as long as it can control pH to be not lower than 7.

Specific examples include, but are not limited to, amines such as diethanol amine and triethanol amine.

There is no specific limit to the properties of the ink in the ink set of the present disclosure and it can be suitably selected to suit to a particular application. For example, the viscosity, the surface tension, pH, etc, are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'× R24)
Sample liquid amount: 1.2 mL
Rotational frequency: 50 rotations per minute (rpm)
25 degrees C.
Measuring time: three minutes The dynamic surface tension at 25 degrees C. of the ink is preferably 35.0 mN/m or less and more preferably 32.0 mN/m or less in terms that the ink is suitably leveled on a recording medium and the drying time of the ink is shortened.

The static surface tension at 25 degrees C. of the ink is preferably 22.0 mN/m or more, more preferably 24.0 mN/m or more, furthermore preferably 26.0 mN/m or more, and particularly preferably 28.0 mN/m or more. In terms of stabilizing discharging properties, the upper limit is preferably 32.0 mN/m or less and more preferably 30.5 mN/m or less.

pH of the ink is preferably from 7 to 12 and more preferably from 8 to 11 in terms of prevention of corrosion of metal material in contact with liquid.

Static surface tension and dynamic surface tension of the ink can be measured at 25 degrees C. by using, for example, a fully-automatic surface tensiometer (CBVP-Z, manufactured by Kyowa Interface Science Co., Ltd.) and DynoTester (manufactured by SITA Messtechnik GmbH). The surface tensions are measured five times and the average of the three measuring data excluding the maximum value and the minimum value is calculated as the measuring value.

Static surface tension and dynamic surface tension of the ink can be controlled by the type and the amount of water, an organic solvent, a surfactant, and other additives contained in the ink.

The usage of the ink set of the present disclosure is not particularly limited and can be suitably selected to suit to a particular application. For example, the ink can be used for printed matter, a paint, a coating material, and foundation.

The ink can be used to form two-dimensional texts and images and furthermore a three-dimensional solid object (solid fabrication object or solid freeform fabrication object) as a material for 3D modeling.

Any known device can be used as the solid freeform fabrication device to fabricate a solid fabrication object with no particular limit. For example, the device is formed of a container, a supplying device, and a discharging device, a drier, etc. of ink. The solid fabrication object includes an object manufactured by repeated ink coating. In addition, the solid fabrication object includes a molded processed product manufactured by processing a structure having a substrate such as a recording medium to which the ink is applied. The molded processed product is manufactured by, for example, heating drawing or punching recorded matter or a structure having a sheet-like form, film-like form, etc. The molded processed product is suitably used for articles which are molded after surface-decorating. Examples are gauges or operation panels of vehicles, office machines, electric and electronic devices, cameras, etc.

Image Forming Device

The image forming device of the present disclosure includes a dark color ink having a static surface tension A, a light color ink having a static surface tension B, and an inkjet head including a nozzle plate including a first nozzle array and a second nozzle array disposed adjacent to the first nozzle array, the first nozzle array including multiple first nozzles to discharge dark color ink, and a second nozzle array including multiple second nozzles to discharge light color ink, and each nozzle of the multiple first nozzles and the multiple second nozzles having a cylindrical portion having a length of 25 µm or longer along the axial direction. The static surface tension A is by 0.6 mN/m or more greater than the static surface tension B.

For the dark color ink and the light color ink, the inks mentioned in the ink set can be used. Black color is preferably used as the dark color ink and yellow ink is preferably used as the light color ink.

The image forming device of the present disclosure can be suitably usable for various image forming devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the image forming device represents a device capable of discharging ink, various processing liquids, etc. to a recording medium and forming images. The recording medium means an article to which ink or various processing fluids can be temporarily or permanently attached.

The image forming device may furthermore optionally include a device relating to feeding, conveying, and ejecting a recording medium, a wiping device to wipe off the nozzle surface of the head, a device to recover defective discharging, and other devices referred to as a pre-processing device, a post-processing device, etc. in addition to the head portion to discharge the ink.

The image forming device may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the image forming device are not limited to those producing meaningful visible images such as texts and figures with ink. For example, the recording method and the recording device capable of producing patterns like geometric design and 3D images are included.

In addition, the image forming device includes both a serial type device in which the discharging head is allowed to move and a line type device in which the liquid discharging head is not moved, unless otherwise specified.

Furthermore, in addition to the desktop type, this image forming device includes a device capable of printing images on a wide recording medium such as A0 and a continuous printer capable of using continuous paper rolled up in a roll-like form as a recording medium.

Figure 2:
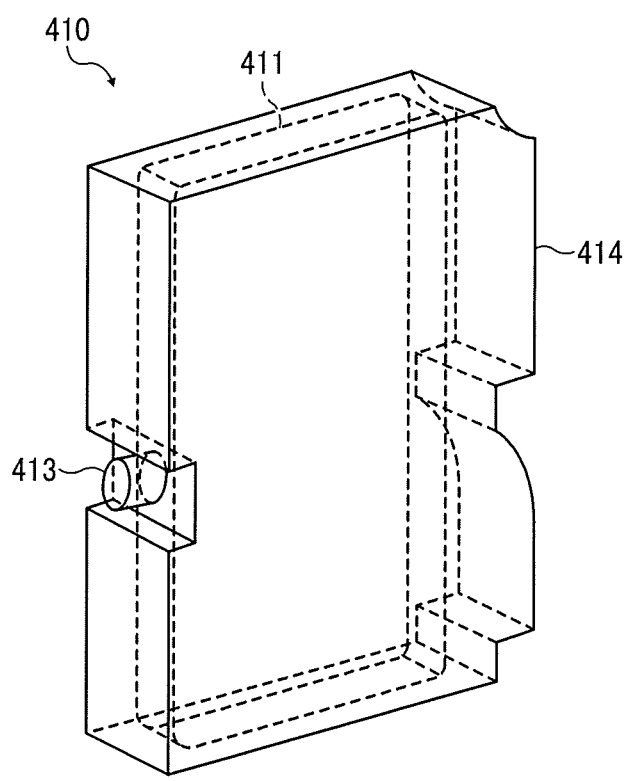
FIG. 2 is a diagram illustrating a perspective view of an example of a main tank.

An example of the image forming device of a serial type is described with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating unit 411 of each main tank 410 (410$k$, 410$c$, 410$m$, and 410$y$) for each color of black (K), cyan (C), magenta (M), and yellow (Y) is made of, for example, a packaging member such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401$c$ is opened. The main tank 410 is detachably attached to the cartridge holder 404. This enables each ink outlet 413 of the main tank 410 to communicate with a discharging head 434 for each color via a supplying tube 436 for each color so as to discharge the ink from a discharging head 434 to a recording medium.

The configuration of the discharging head 434 is described in detail.

This recording device may include not only a portion to discharge ink but also devices referred to as a cleaning device, a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid or a post-processing fluid and a liquid discharging head to discharge the pre-processing fluid or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

Figure 3:
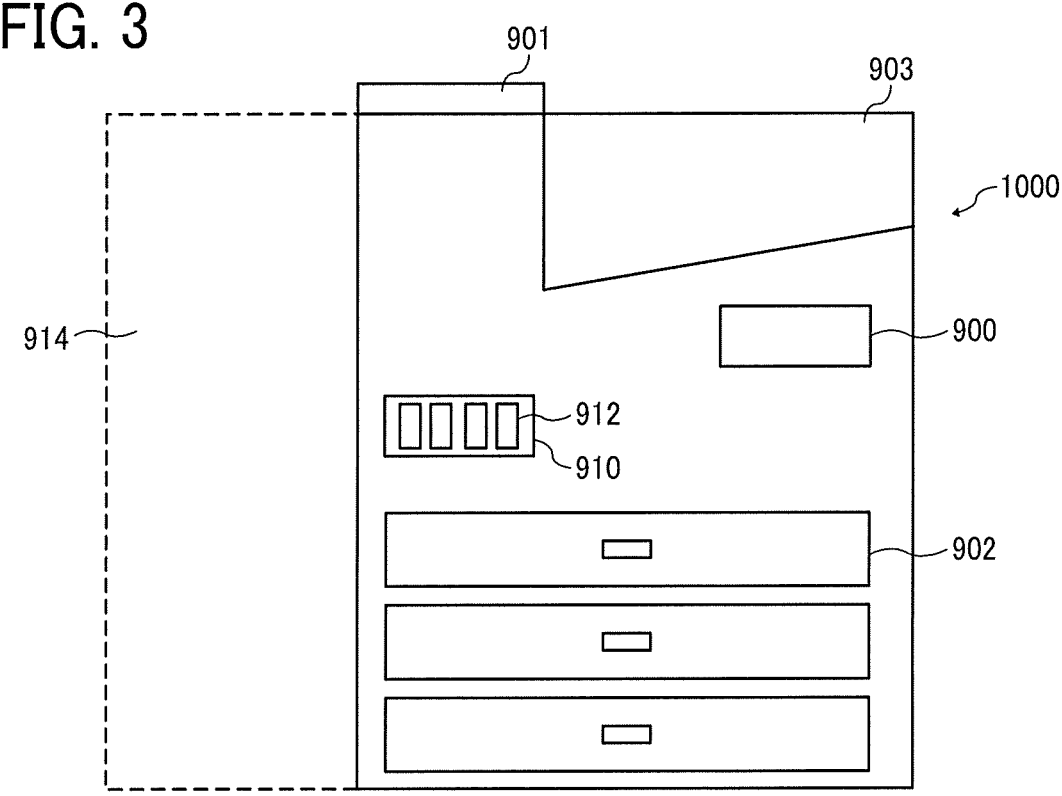
FIG. 3 is a schematic diagram illustrating an example of the image forming device of a line type.
Figure 4:
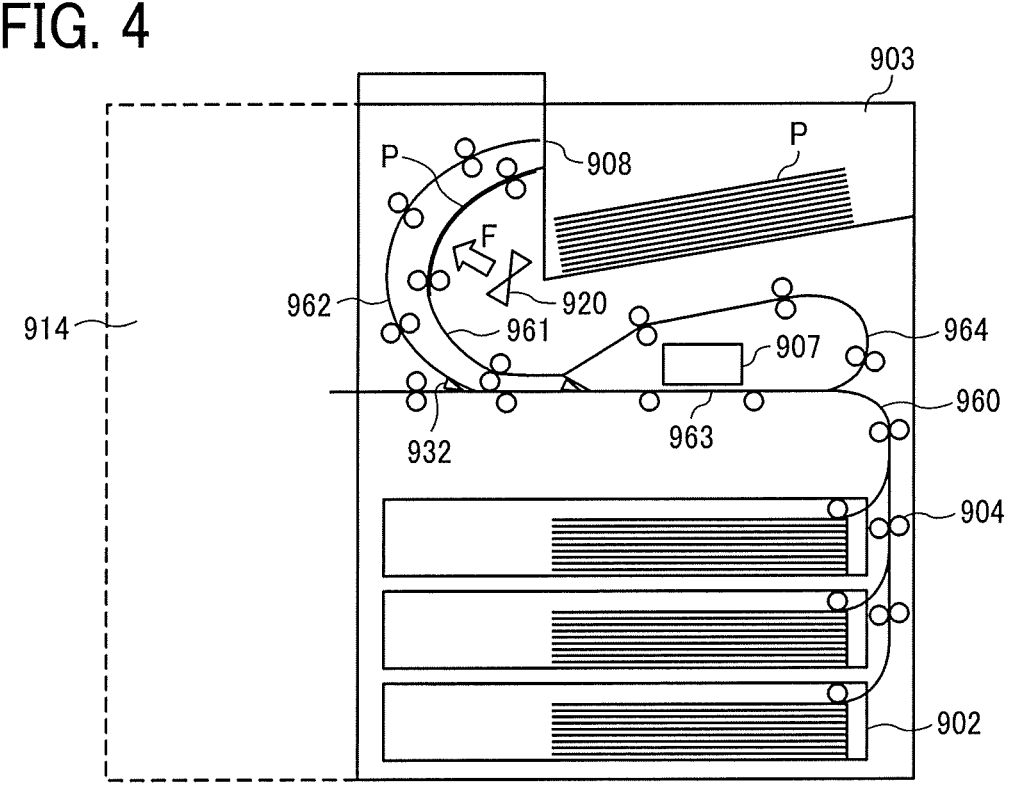
FIG. 4 is a schematic diagram illustrating an example of the inside of the image forming device of a line type.

A line type image forming device is described using an example with reference to FIG. 3 and FIG. 4. An image forming device (hereinafter also referred to as device) 1000 includes a sheet feeder tray 902, a sheet ejection tray 903, an operation unit 900, an ADF 901, a cartridge holder 910, an ink cartridge 912, and a post-processing device 914. The reference symbol F means a fan as a drying device The sheet feeder tray 902 accommodates a sheet P (recording medium). The sheet ejection tray 903 is the ejection destination of the sheet P on which an image, etc. is formed by an inkjet head, which is described later. The operation unit 900 includes a touch panel, a physical button, etc., and a user can instruct a print command, etc. to the device via the operation unit 900. The ADF 901 is a so-called scanning device.

The ink cartridge 912 is a liquid storage container storing ink to be discharged by the inkjet head, and is mounted onto the cartridge holder 910. The ink in the ink cartridge 912 is sent to the inkjet head via a tube, etc. The post-processing device 914 staples and/or folds the sheet P.

FIG. 4 is a diagram illustrating the configuration inside the image forming device 1000. The image forming device 1000 includes a conveying roller 904, a conveyance path 960, an inkjet head 907, a sheet ejection port 908, a switching unit 932, a sheet reversing path 961, a sheet ejection path 962, an above-head path 964, a discharging path 963, and a drying device 920.

The conveying roller 904 conveys the sheet P on the sheet feeder tray 902 and the conveyance path 960 in the conveying direction. In the conveying roller 904, rollers rotatable by a driving source such as a motor and rollers just fitted in bearings without a driving force are combined (those rollers are not individually distinguished in this embodiment).

The conveyance path 960 is configured in such a manner that the sheet P stacking on the sheet feeder tray 902 is conveyed on the conveyance path and ejected through the sheet ejection port 908 after the sheet P passes below the inkjet head 907. The inkjet head 907 discharges ink to the sheet P on the conveyance path 960 and is, for example, a piezoelectric inkjet head using a piezoelectric element or a thermal inkjet head utilizing heat. Further, in the present embodiment, a so-called line type ink jet head (or a single pass type ink jet head) in which a plurality of inkjet heads are arranged in a direction crossing the conveying direction of the sheet P is used.

The switching unit 932 is a claw to switch the conveying direction of the sheet P and guides the sheet P to which the ink is applied to the post-processing device 914, to the sheet ejection port 908, and to the sheet reversing path 961, which is described later.

The sheet reversing path 961, the sheet ejection path 962, the above-head path 964, and the discharging path 963 form the conveyance path 960 described above. The sheet reversing path 961 turns the sheet P to which the ink is applied.

To reverse the sheet P, the switching unit 932 disposed downstream of the inkjet head 907 in the conveying direction of the sheet P is operated to guide the sheet P to which the ink is applied to the sheet reversing path 961. After the sheet P reaches the vicinity (near the sheet ejection port 908) of the end portion of the sheet reversing path 961, the sheet P is conveyed to the upstream by, for example, reversing the driving of the conveying roller 904.

Thereafter, the sheet P is conveyed to the discharging path 963 via the above-head path 964 disposed above the inkjet head 907. The sheet P is reversed this way.

After the ink applied to one side or both sides of the sheet P, the sheet P is guided to the sheet ejection path 962. The sheet ejection path 962 links the inkjet head 907 with the sheet ejection port 908, and the sheet P is ejected from the sheet ejection port 908 to the sheet ejection tray 903.

Moreover, in the present embodiment, since the sheet ejection tray 903 is disposed vertically above the inkjet head 907, the sheet ejection path 962 curves (or warps) toward the side of the inkjet head 907 from the downstream of the inkjet head 907 to the sheet ejection port 908. Furthermore, the sheet reversing path 961 is disposed so as to be adjacent to the sheet ejection path 962.

Therefore, the sheet reversing path 961 and the sheet ejection path 962 can be accommodated in a small space.

In addition, the drying device 920 dries the ink applied to the sheet P. The drying device 920 includes a device to rotate a fan to send air and a device including a heating unit such as a heater to heat and dry the sheet P. Also, the combinations thereof may be used. In the present embodiment, the drying device 920 is a air blowing device that sends air by rotating a fan.

The drying device 920 may be disposed in such a manner that the sheet reversing path 961 and the sheet ejection path 962 are partially disposed in the air blowing direction (or the irradiation direction of the heating energy by the heating portion, here collectively referred to as the irradiation direction of the drying energy) of the drying device 920.

Due to this, both the sheet P located on the sheet reversing path 961 and the sheet P located on the sheet ejection path 962 can be irradiated with the drying energy by the drying device 920 so that the sheet P can be dried with such a simple configuration.

Moreover, in this embodiment, in the irradiation direction of drying energy by the drying device 920, the sheet reversing path 961 is disposed closer to the drying device 920 than the sheet ejection path 962. Therefore, the sheet P conveyed to the sheet reversing path 961 during double-sided printing is immediately and efficiently dried.

Like the image forming device 1000, if a drying device is disposed around the inkjet head in the middle of the conveying path or the sheet reversing path, the ink at the nozzle of the head significantly dries. If color mixing of colors having different properties occurs at this point, the ink is significantly modified so that ink discharging significantly deteriorates as the ink dries at the nozzle. Due to the usage of the ink set of the present disclosure, ink mixing can be prevented and recoverability is enhanced. Therefore, a drying device disposed around the inkjet head to enhance the drying property does not easily degrade ink discharging.

In addition, although embodiments using cut paper have been described, continuous recording media such as continuous paper and folded paper having folds can be used, and a device for winding up a recording medium may be included.

The image forming device of the present disclosure is applicable to each of the above-described configurations. Also, it may furthermore optionally include a pre-processing device to apply a pre-processing fluid to a recording medium before an image portion is formed thereon, a post-processing device to apply a post-processing fluid to the recording medium after the image portion is formed, a wiping member to wipe off the nozzle surface of the head, a recovery device to recover defective discharging, etc.

The recovery device recovers defective discharging by, for example, a method of idle ink discharging or ink suction with a reduced pressure.

An image forming device to form an image using an inkjet head incurs adhesion of dirt onto the nozzle surface due to adhesion of ink droplets to the nozzle surface as ink is discharged. At this point, the dirt can be wiped off using the wiping device to wipe off the nozzle surface. The wiping member of the wiping device is not particularly limited. For example, a wiper blade and a non-woven fabric can be used. Further, in the case of using a non-woven fabric as the wiping member, it is possible to improve the wiping efficiency by applying cleaning liquid to the wiping member at the time of wiping.

Figure 5:
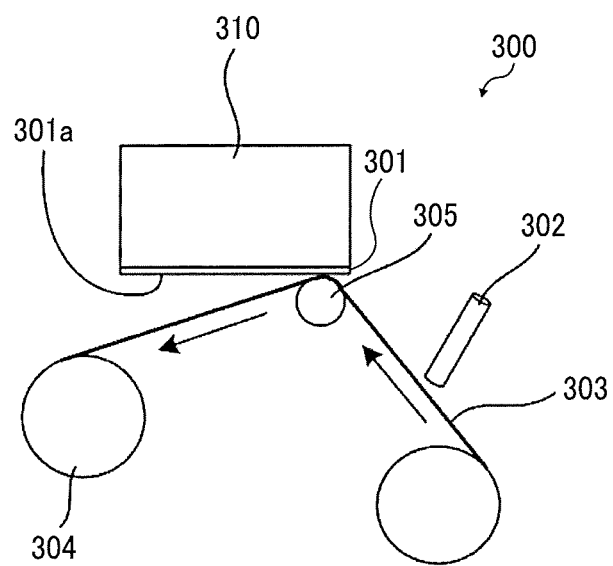
FIG. 5 is a schematic diagram illustrating an example of a wiping member.

A wiping device using a non-woven fabric is described as an example of the wiping device with reference to FIG. 5.

A wiping device 300 illustrated in FIG. 5 cleans a nozzle surface 301a on the ink discharging side of a nozzle plate 301 of an ink discharging head 310.

The wiping device 300 includes an non-woven 303 as the wiping member, a cleaning liquid applying nozzle 302 as the cleaning liquid applying device, a pressing roller 305 as the pressing member, and a roll-up roller 304 to roll up the non-woven fabric after wiping.

The cleaning liquid is supplied from a cleaning liquid tank via a cleaning liquid supply tube. A pump disposed in the middle of the cleaning liquid supply tube is driven to cause the cleaning liquid application nozzle 302 to apply the cleaning liquid to the non-woven fabric 303 as the wiping member in an amount in accordance with the recording time. The non-woven fabric 303 is rolled up in a roll-like form.

As illustrated in FIG. 5, the non-woven fabric 303 to which the cleaning liquid is applied is brought into contact with the nozzle surface 301a of the ink discharging head 310 under a pressure applied by the pressing roller 305 as the pressing member so that the nozzle surface 301a is cleaned. After the wiping process is complete, the non-woven fabric 303 is rolled up by the roll-up roller 304.

It is possible to provide multiple cleaning liquid application nozzles 302. A pressure can be applied thereto based on the control by the control device. The application amount of the cleaning liquid can be adjusted by suitably changing the pressure. In addition, based on the control of the control device, the number of nozzles to apply the cleaning liquid is changed to adjust the application amount of the cleaning liquid. In addition, based on the control of the control device, the number of applications of the cleaning liquid is changed to adjust the application amount of the cleaning liquid.

The method of cleaning the nozzle surface of the ink discharging head on the side of ink discharging is as follows:

At the time of application of the cleaning liquid, a pressure can be applied to the cleaning liquid application nozzle. The application amount of the cleaning liquid can be adjusted suitable by changing the pressure. In addition, it is possible to adjust the application amount of the cleaning liquid by changing the number of the cleaning liquid application nozzles. Furthermore, it is possible to adjust the application amount by changing the number of applications of the cleaning liquid through the cleaning liquid applying nozzle. The nozzle surface can be wiped off after recording using the wiping member to which the cleaning liquid is already applied.

In the image forming device described above, it is possible to dispose a plurality of heads to discharge monochrome ink. However, in terms of downsizing the device, it is possible to discharge multiple color inks with a single head. In the case of a serial type image forming device, since images can be printed on the entire area of a recording medium by scanning a carriage having a head, it is possible to form an image with a small number of heads. However, when a line type image forming device is used, a plurality of heads are required in accordance with the width of the recording medium. Therefore, in the case of a line-type image forming device, it is preferable to use a head capable of discharging multiple color inks to avoid upsizing caused by providing respective discharging heads for respective colors. Hereinafter, in the present embodiment, an image forming device having a plurality of nozzle arrays and using a head capable of discharging multiple color inks will be described.

Inkjet Head

Figure 6:
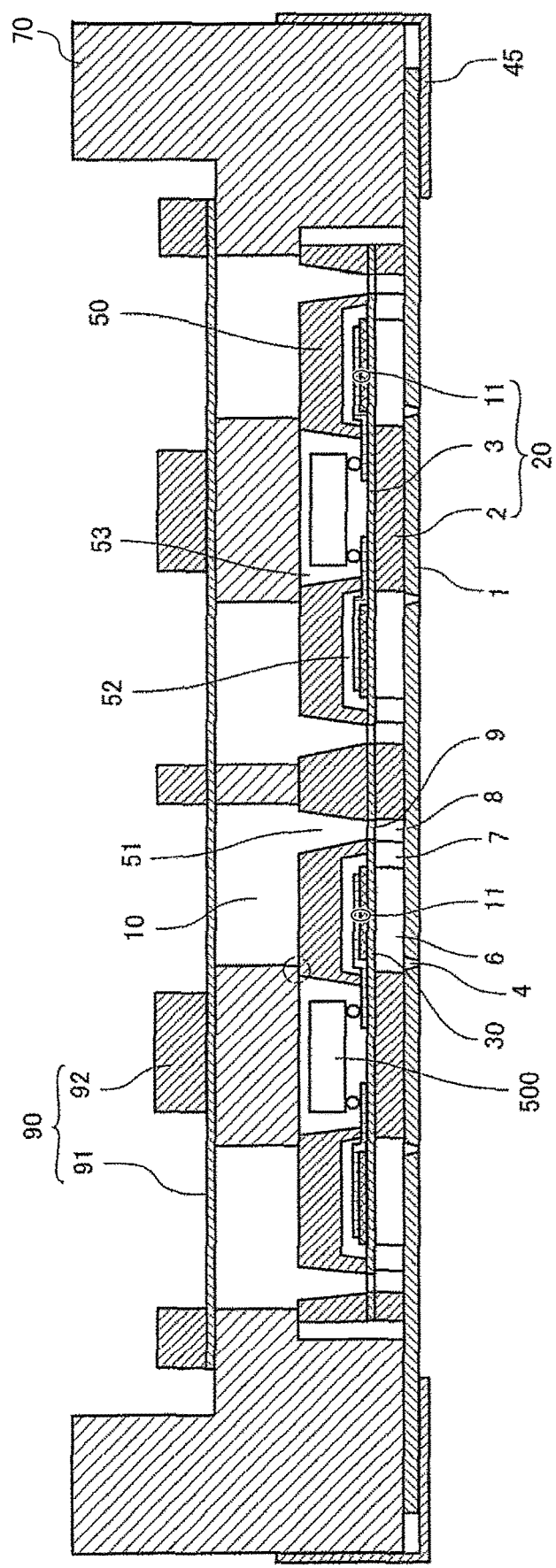
FIG. 6 is a diagram illustrating a cross section of an inkjet head in a direction orthogonal to the nozzle arrangement direction.
Figure 7:
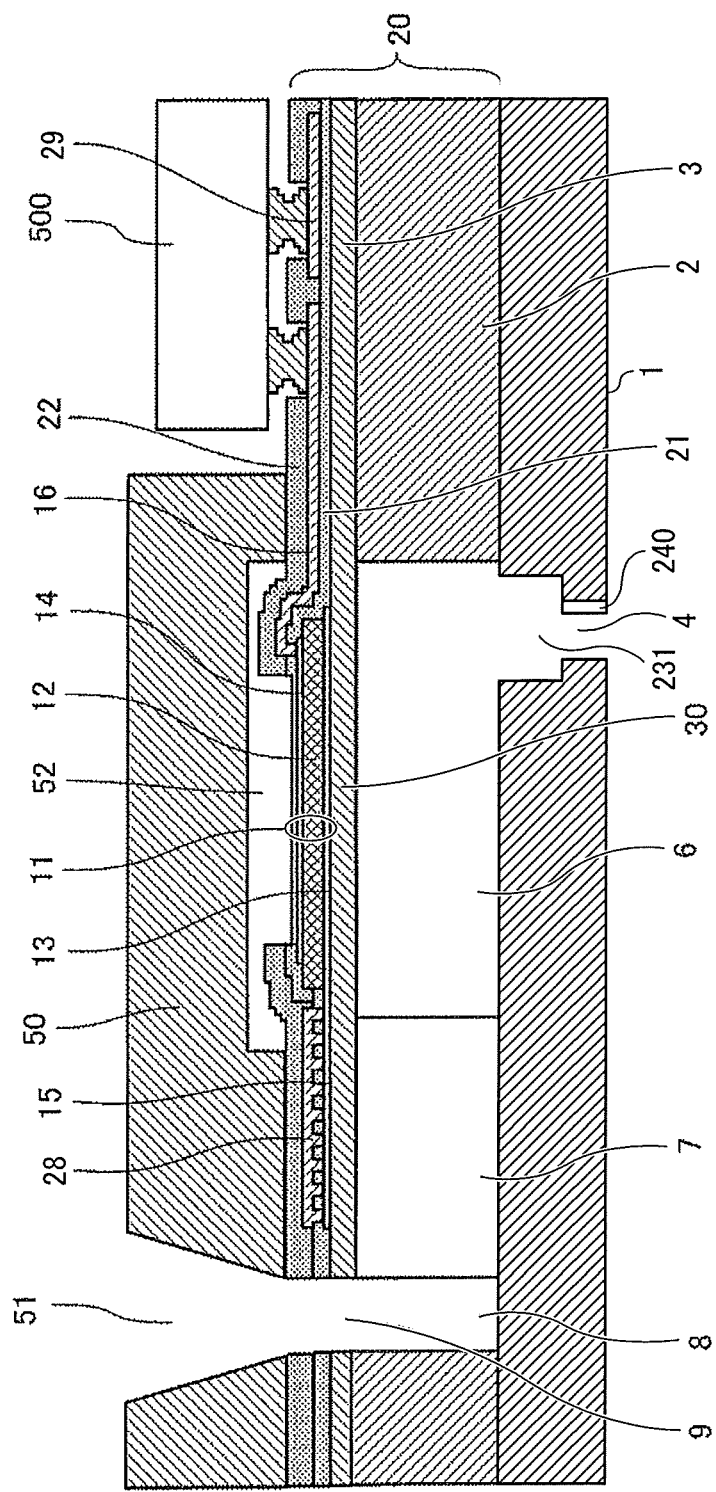
FIG. 7 is a diagram illustrating an enlarged cross section of the inkjet head illustrated in FIG. 6.
Figure 8:
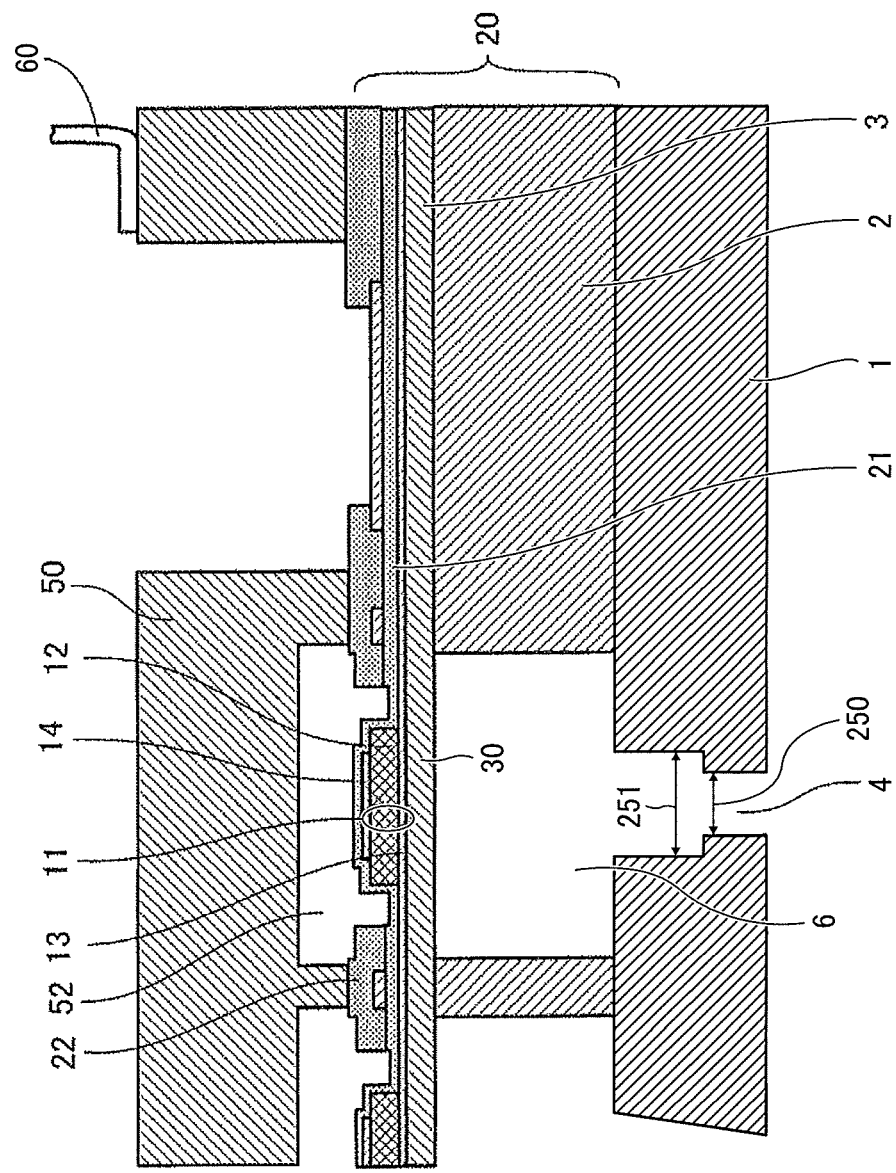
FIG. 8 is a diagram illustrating a cross section along the nozzle arrangement direction of the inkjet head.

Next, the inkjet head for use in the present disclosure will be described with reference to FIG. 6 to FIG. 8. FIG. 6 is a diagram of an explanatory cross-section illustrating an inkjet head along the direction orthogonal to the nozzle arrangement direction of the inkjet head. FIG. 7 is a diagram of an explanatory enlarged cross-section illustrating a part of the inkjet head illustrated in FIG. 6. FIG. 8 is a diagram illustrating an explanatory enlarged cross-section illustrating the inkjet head along the nozzle arrangement direction of the inkjet head.

The inkjet head includes a nozzle plate 1, a flow path plate 2, a diaphragm member 3 as a wall member, a piezoelectric element 11 as a pressure generating element, a holding substrate 50, a wiring member 60 such as a flexible printed circuit (FPC), a common liquid chamber member 70, and a cover 45.

The part constituted of the flow path plate 2, the diaphragm member 3, and the piezoelectric element 11 forms the actuator substrate 20.

The nozzle plate 1 forms multiple nozzles 4 to discharge liquid. In this embodiment, four nozzle arrays in which nozzles 4 are arranged are arranged in four rows.

Together with the nozzle plate 1 and the diaphragm member 3, the flow path plate 2 forms an individual liquid chamber 6 communicating with the nozzle 4, a liquid resistance 7 communicating with the individual liquid chamber 6, and a liquid introducing portion 8 communicating with the liquid resistance 7.

This liquid introducing portion 8 communicates with a common liquid chamber 10 formed of the common liquid chamber member 70 via an opening 9 of the diaphragm member 3 and an opening 51 as a flow path of the holding substrate 50.

The diaphragm member 3 forms a deformable vibration area 30 that partially form the wall surface of the individual liquid chamber 6. A piezoelectric element 11 is integrally provided with the deformable vibration area 30 on the surface of the diaphragm member 3 on the opposite side of the individual liquid chamber 6 of the deformable vibration area 30. This piezoelectric element 11 and the deformable vibration area 30 constitute a piezoelectric actuator.

The piezoelectric element 11 is constituted by sequentially laminating a lower electrode 13, a piezoelectric layer (piezoelectric body) 12, and an upper electrode 14 from the side of the deformable vibration area 30. An insulating film 21 is formed on the piezoelectric element 11.

The lower electrode 13 serving as a common electrode of the plurality of piezoelectric elements 11 is connected to the common electrode power supply wiring pattern 28 via a common wiring 15. The lower electrode 13 is an electrode layer formed across all the piezoelectric elements 11 in the nozzle arrangement direction.

The upper electrode 14 serving as an individual electrode of the piezoelectric element 11 is connected to a driving IC (hereinafter referred to as driver IC) 500 which is a driving circuit portion via an individual wiring 16. The individual wiring 16, etc. are covered with an insulating film 22.

The driver IC 500 is mounted onto the actuator substrate 20 by a method such as flip chip bonding so as to cover the area between the piezoelectric element arrays.

The driver IC 500 mounted onto the actuator substrate 20 is connected to an individual electrode power supply wiring pattern 29 to which a driving waveform (driving signal) is supplied.

The wiring provided on the wiring member 60 is electrically connected to the driver IC 500, and the other end of the wiring member 60 is connected to the control unit on the image forming device side.

A holding substrate 50 covering the piezoelectric element 11 on the actuator substrate 20 is joined to the actuator substrate 20 on side of the diaphragm member 3 with an adhesive.

On the holding substrate 50, there are provided an opening 51 partially constituting a flow path communicating the common liquid chamber 10 with the individual liquid chamber 6, a recessed portion 52 accommodating the piezoelectric element 11, and an opening portion 53 accommodating the driver IC 500. The opening 51 is a slit-shaped through hole extending in the nozzle arrangement direction, and partially constitutes the common liquid chamber 10.

The holding substrate 50 is interposed between the actuator substrate 20 and the common liquid chamber member 70 and partially forms the wall surface of the common liquid chamber 10.

The common liquid chamber member 70 forms the common liquid chamber 10 to supply liquid to each individual liquid chamber 6. The common liquid chamber 10 is provided to each of the four nozzle arrays, and the liquid of the predetermined color is supplied thereto from the outside.

A damper member 90 is joined to the common liquid chamber member 70. The damper member 90 has a deformable damper 91 partially forming the wall surface of the common liquid chamber 10 and a damper plate 92 reinforcing the deformable damper 91.

The common liquid chamber member 70 is joined to the outer peripheral portion of the nozzle plate 1 and the holding substrate 50 with an adhesive, and accommodates the actuator substrate 20 and the holding substrate 50 to constitute the frame of this head.

The cover 45 is provided to partially cover the peripheral portion of the nozzle plate 1 and the outer peripheral surface of the common liquid chamber member 70.

In this liquid discharging head, the driver IC 500 applies a voltage between the upper electrode 14 and the lower electrode 13 of the piezoelectric element 11 to expand the piezoelectric layer 12 in the electrode lamination direction, that is, the electric field direction, and shrink it parallel to the deformable vibration area 30. Therefore, a tensile stress is generated in the deformable vibration area 30 on the side of the lower electrode 13, and the deformable vibration area 30 warps toward the individual liquid chamber 6 to pressurize the liquid inside, whereby the liquid is discharged from the nozzle 4.

The nozzle 4 to discharge ink has a cylindrical form and is formed on the nozzle plate 1. The nozzle 4 has an introduction portion 231, which communicates with the nozzle 4 and introduces ink into the nozzle 4. FIGS. 7 and 8 are schematic diagrams illustrating a nozzle and the first nozzle and the second nozzle have the same form.

As illustrated in FIGS. 7 and 8, a structure having two stages of vertical holes of the nozzle 4 and the introduction portion 231 is employed so as to align the discharging direction of ink droplets to the central axis direction of the nozzle 4, thereby stabilizing ink discharging.

The nozzle diameter 250 of the nozzle 4 is not particularly limited. In terms of the discharging properties, it is preferably from 20 to 30 µm and more preferably from 20 to 25 µm. The discharging properties mean variations of ink discharging (size of ink droplets, variation in the discharging direction of ink, etc.).

The nozzle 4 has a cylindrical portion 240 having the same diameter as the discharging opening diameter. The cylindrical portion 240 having the same diameter as the discharge opening diameter means that the nozzle 4 is formed into a cylindrical form, and the central axis of the nozzle 4 is parallel to the discharging direction. It is not necessary that the cylindrical portion 240 be strictly parallel, but has at least opposing sides that are significantly parallel to each other.

It should be noted that the same diameter does not need to have exactly the same diameter over the entire cylindrical portion. This is because minute distortion may occur at the time of manufacture. In order to improve the discharging properties, the difference between the discharging opening diameter and the diameter of the cylindrical portion is preferably 5 percent or less, more preferably 1 percent or less, furthermore preferably 0.5 percent or less, and particularly preferably 0.1 percent or less.

Moreover, in the present disclosure, the cylindrical portion 240 of the nozzle 4 has a length of 25 µm or more and preferably 30 µm or more in the axial direction. When the length of the cylindrical portion 240 is 25 µm or more in the axial direction, it is possible to significantly reduce bending of ink discharging so that higher quality images can be formed.

However, when the length of the cylindrical portion 240 is 25 µm or more in the axial direction and different inks enter from the opening on the side of a nozzle surface, the capillary action strongly works so that color mixing in the nozzle (head) occurs. At this point, color mixing may occur to the inside of the second nozzle, or further to the introduction portion 231 or the individual liquid chamber 6. If the dark color ink (black ink) mistakenly enters into the nozzle of light color ink (yellow ink), the color of the ink greatly changes, thereby degrading the image quality.

The ink set of the present disclosure contributes to prevention of color mixing.

Note that when the nozzle 4 is tapered, capillary action is not strong, so that color mixing does not create a large problem. When the length the cylindrical portion 240 having the same diameter as the discharging opening diameter of the nozzle 4 in the axial direction is less than 25 µm, image defects ascribable to different ink mixing caused by the capillary action do not occur and discharging stability after nozzle surface cleaning and recoverability afterwards are excellent. However, it is not good in terms of bending of ink discharging.

The upper limit of the length of the cylindrical portion along the axial direction is preferably 100 µm or less, and more preferably 50 µm or less. Within this range, ink can be discharged from the nozzle of a small inkjet head without applying a large pressure.

The introduction portion 231 communicates with the nozzle 4 and has a diameter 251 larger than a nozzle diameter 250 of the nozzle 4. The diameter 251 of the introduction portion 231 is not particularly limited. The diameter 251 being larger than the nozzle diameter 250 is preferable because ink can be supplied to the nozzle 4 with a small pressure.

The form of the introduction portion 231 may be tapered or cylindrical. However, it is preferable that the introduction portion 231 have a cylindrical shape since bending of ink discharging is diminished.

The material of the nozzle plate is not particularly limited. For example, a metal or a silicon material is used.

Figure 9:
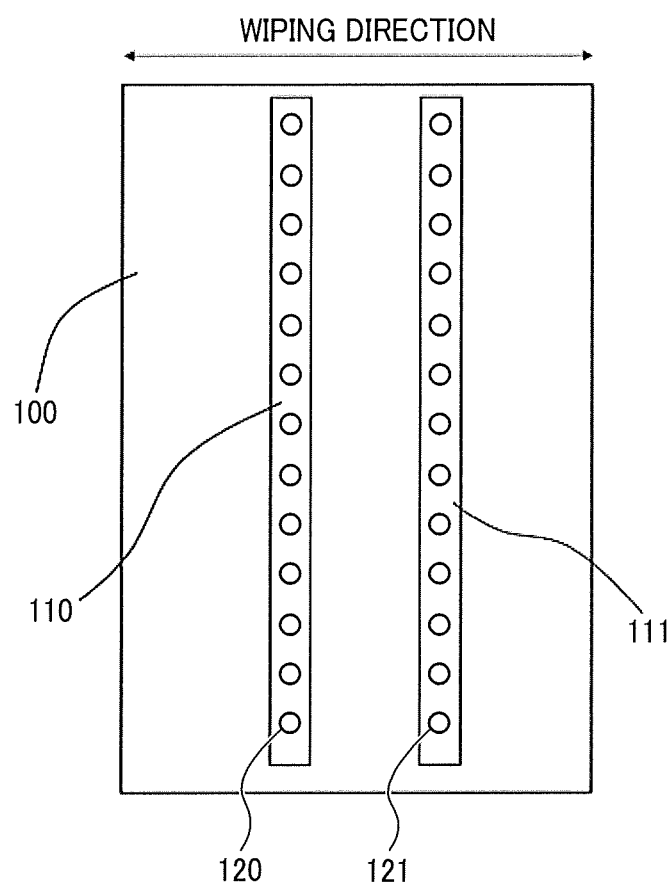
FIG. 9 is a schematic diagram illustrating the nozzle surface of the inkjet head for use in the image forming device.

Next, the ink discharging surface (hereinafter, also referred to as the nozzle surface) of the nozzle plate 1 will be described with reference to FIG. 9. FIG. 9 is a schematic diagram illustrating the nozzle plate 1 viewed from the ink discharging surface. While FIG. 6 is a schematic diagram illustrating an ink jet head having four nozzle arrays, FIG. 9 is a schematic diagram illustrating the nozzle surface having two nozzle arrays. The number of nozzle arrays can be appropriately adjusted without limitation.

A nozzle surface 100 has multiple nozzle arrays on which multiple nozzles are formed. FIG. 9 is a diagram illustrating a nozzle surface having two nozzle arrays of a first nozzle array 110 on which a plurality of cylindrical first nozzles 120 are arranged and a second nozzle array 111 on which a plurality of cylindrical second nozzles 121 are arranged. The two nozzle arrays are disposed adjacent to each other. The number of nozzle arrays is not particularly limited and may be, for example, three or four. In addition, the axial direction of each of the first nozzle array 110 and the second nozzle array 111 may not be necessarily orthogonal to the wiping direction of the wiping member as long as it intersects the wiping direction. It should be noted that the first nozzle array 110 and the second nozzle array 111 may be arranged opposite to each other in the illustrated arrangement.

The first nozzle 120 is capable of discharging the dark color ink and the second nozzle 121 is capable of discharging light color ink. Hereinafter, black ink is used as the dark color ink and yellow ink is used as the light color ink.

Due to image formation, ink dirts adhere to the nozzle surface. The black ink adheres around the first nozzle array 110 and the yellow ink adheres around the second nozzle array 111. The ink adhering to the nozzle surface is wiped off by the wiping member to maintain the discharging properties.

When wiping from the second nozzle array 111 to the first nozzle array 110, the first nozzle 120 is wiped after the yellow ink adheres to the wiping member. At this point, the yellow ink as the light color ink may be mixed into the black color ink as the dark color ink.

However, the black color little changes if color mixing occurs, which does not lead to production of defective images.

On the other hand, when wiping from the first nozzle array 110 to the second nozzle array 111, the second nozzle 121 is wiped after the black ink adheres to the wiping member. At this point, the black ink as the dark color ink may be mixed into the yellow color ink as the light color ink. As a result, the yellow color greatly changes if color mixing occurs, which leads to production of defective images.

In addition, when wiping from the second nozzle array 111 to the first nozzle array 110 and the black ink already adheres to the wiping member by the previous wiping operations, the black ink may be mixed into the nozzle 121 that discharges the yellow ink, which leads to production of defective images.

When color mixing occurs in the nozzle by wiping the nozzle surface 100, such color mixing is recovered by idle discharging, suction, etc., so that image defects ascribable to color mixing can be avoided.

However, for the first nozzle 120 and the second nozzle 121 having a length of 25 μm or more in the axial direction of the cylindrical portion 240 having the same diameter as the discharging opening diameter, when the static surface tension of the ink of the ink set for use in the image formation is not optimized, the ink is taken up deep (high) and mixed in the nozzle due to capillary action, which may be beyond the ability of recovery or require recovery operations more times than usual. This results in an increase of waste amount of ink or image defects.

Such defects do not occur when using the ink set of the present disclosure.

Image Forming Method

Subsequently, an image forming method using the image forming device 1000 will be described. This image forming method includes ink application and may further optionally include drying, wiping, etc.

The ink is applied to the fed sheet (recording medium) P by the ink applying device (inkjet head) 907 to form an image thereon. The image to be formed is not limited to be meaningful such as letters and graphics, but includes patterns such as geometric patterns and three-dimensional images.

An ink jet head is used as the ink applying device, and the inkjet head described with reference to FIGS. 6 to 8 is used. Specifically, the inkjet head includes a nozzle plate having a first nozzle array having a plurality of cylindrical first nozzles to discharge dark color ink (black ink), and a second nozzle array having a plurality of cylindrical second nozzles to discharge light color ink (yellow ink) and the first nozzle array and the second nozzle array are disposed adjacent to each other. Also, the cylindrical portion having the same diameter as the discharging opening diameter of the first nozzle and the second nozzle has a length of 25 μm or more in the axial direction of the cylindrical portion. The other configuration of the inkjet head is the same as that of the image forming device described above.

In addition, the ink in the ink set described above can be used in the image forming method. The ink set contains the dark color ink (black ink) and the light color ink (yellow ink). The static surface tension A of the dark color ink (black ink) is by 0.6 mN/m or more larger than the static surface tension B of the light color ink (yellow ink). The other ink configuration is the same as that of the ink set described above.

The sheet (recording medium) P to which the ink is applied is dried by the drying device 920. The method of drying the ink applied to the sheet P is not particularly limited.

Examples of the method include, but are not limited to, a method of drying the recording medium to which the ink is applied by bringing a heated fluid such as warm air into contact with the recording medium, a method of drying the recording medium to which the ink is applied by bringing the recording medium into contact with a heated object to transfer heat, and a method of drying the recording medium to which the ink is applied with energy rays such as infrared rays or far infrared rays.

The dirt adhering to the nozzle surface is removed by wiping the nozzle surface on the ink discharging surface side of the inkjet head by the wiping device 300 illustrated in FIG. 5.

The wiping device is not particularly limited. For example, a wiper blade or a non-woven fabric is used. A non-woven fabric is preferable because it is possible to apply a cleaning liquid to the non-woven fabric for efficient wiping. In addition, the nozzle surface can be efficiently cleaned by a combinational use of the non-woven fabric and the wiper blade.

Recording Medium

The recording medium for use in recording is not particularly limited.

Specific examples include, but are not limited to, plain paper, gloss paper, special paper, cloth, film, transparent sheets, and printing paper for general purpose.

The recording media are not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

Recorded Matter

The ink recorded matter includes a recording medium and an image formed on the recording medium with the ink set of the present disclosure.

The recorded matter is obtained by an inkjet recording device executing an inkjet recording method.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto.

Preparation Example of Black Pigment Dispersion 160 parts of carbon black (NIPEX 160, manufactured by Degussa AG) having a BET specific surface area of 150 m$^2$, an average primary particle diameter of 20 nm, a pH of 4.0, and a DBP oil absorption ampount of 620 g/100 g, 400 parts of polyoxyethylene (POE) (m=40)-β-naphthyl ether (manufactured by Takemoto Oil & Fat Co., Ltd.), and 440 parts of deionized water were premixed to prepare a slurry mixture. Using a disk type media mill DMR type (manufactured by Ashizawa Finetech Ltd.) with zirconia beads having a diameter of 0.05 mm (filling rate: 55 percent), the slurry mixture was circularly dispersed at a peripheral speed of 10 m/s and a liquid temperature of 10 degrees C. for 3 minutes.

Next, coarse particles were centrifuged by a centrifugal separator (Model-7700, available from Kubota Corporation) to obtain a black pigment dispersion having a pigment concentration of 16 percent by mass.

Preparation Example of Yellow Pigment Dispersion

A yellow pigment dispersion having a pigment concentration of 16 percent by mass was obtained in the same manner as in the preparation of black pigment dispersion except that the carbon black was changed to Pigment Yellow 74 (Fast Yellow 531, manufactured by Dainichiseika Color & Chemicals Mfg. Co., Ltd.).

Preparation Example 1 of Black Ink

Preparation of Black Ink 1

Materials of the following formulation were mixed in such a manner that the total amount was 100 parts. Subsequent to one-hour stirring, the mixture was filtered through a membrane filter having an average pore diameter of 1.2 μm to obtain black ink 1.

| Formulation of Black Ink 1 | |
|---|---|
| Black Pigment Dispersion: | 40.0 parts (6.4 parts in solid component conversion) |
| Glycerin (manufactured by Tokyo Chemical Industry Co. Ltd.): | 15.0 parts |
| 2-pyrroridone (manufactured by Tokyo Chemical Industry Co. Ltd.): | 5.0 parts |
| 1,2-hexane diol (manufactured by Tokyo Chemical Industry Co. Ltd.): | 3.0 parts |
| Triethylene glycol monobutyl ether (manufactured by Tokyo Chemical Industry Co. Ltd.): | 2.0 parts |
| Surfynol 440 as acetylene glycol compound (manufactured by Nissin Chemical co., ltd.): | 1.7 parts |
| SUPERFLEX ® 420 NS (urethane resin, manufactured by DKS Co. Ltd.): | 1.5 parts (solid portion) |
| Deionized water: | Balance |

Preparation Examples 2 to 13 of Black Ink and Preparation Examples 1 to 9 of Yellow Ink Preparation of Black Inks 2 to 13 and Preparation of Yellow Inks 1 to 9

Black inks 2 to 13 and Yellow inks 1 to 9 were obtained in the same manner as in Preparation Example 1 of Black Ink except that the formulation was changed from Table 1 to Table 3.

The static surface tension of each ink was measured five times at 25 degrees C. using a fully automatic surface tensiometer (CBVP-Z, manufactured by Kyowa Interface Science Co., Ltd.), and the average value of three raw measuring values excluding the maximum value and the minimum value was determined as the measured value. In Tables 1 to 3, *Ba represents balance.

TABLE 1

| | Black ink No. | | | | | | |
|---|---|---|---|---|---|---|---|
| | 1 | 2 | 3 | 4 | 5 | 6 | 7 |
| Black pigment dispersion | 40.0 | 40.0 | 40.0 | 40.0 | 40.0 | 40.0 | 40.0 |
| Glycerin | 15.0 | 15.0 | 15.0 | 15.0 | 15.0 | 15.0 | 15.0 |
| 2-pyrroridone | 5.0 | 5.0 | 5.0 | 5.0 | 5.0 | 5.0 | 5.0 |
| 1,2-hexane diol | 3.0 | 3.0 | 3.0 | 3.0 | 3.0 | 3.0 | 3.0 |
| 4-methyl-1,2-pentanediol | — | — | — | — | — | — | — |
| Triethylene glycol monobutylether | 2.0 | 2.0 | 2.0 | 2.0 | 2.0 | 2.0 | 2.0 |
| Diethylene glycol monobutylether | — | — | — | — | — | — | — |
| Surfynol 440 (acetylene glycol-based) | 1.7 | 1.6 | 1.3 | 1.2 | 1.1 | 1.0 | 0.8 |
| BYK-345 (silicone-based) | — | — | — | — | — | — | — |
| SUPERFLEX ® 420NS (urethane-based resin, solid portion) | 1.5 | 1.5 | 1.5 | 1.5 | 1.5 | 1.5 | 1.5 |
| Deionized water | *Ba | *Ba | *Ba | *Ba | *Ba | *Ba | *Ba |
| Total (parts) | 100 | 100 | 100 | 100 | 100 | 100 | 100 |
| Static surface tension (mN/m) | 28.0 | 28.2 | 28.6 | 28.7 | 28.8 | 29.0 | 29.2 |

TABLE 2

| | Black ink No. | | | | | |
|---|---|---|---|---|---|---|
| | 8 | 9 | 10 | 11 | 12 | 13 |
| Black pigment dispersion | 40.0 | 40.0 | 40.0 | 40.0 | 40.0 | 40.0 |
| Glycerin | 15.0 | 15.0 | 15.0 | 15.0 | 15.0 | 15.0 |
| 2-pyrroridone | 5.0 | 5.0 | 5.0 | 5.0 | 5.0 | 5.0 |
| 1,2-hexane diol | 3.0 | 3.0 | 3.0 | 3.0 | — | 3.0 |
| 4-methyl-1,2-pentanediol | — | — | — | — | 3.0 | — |
| Triethylene glycol monobutylether | 2.0 | 2.0 | 2.0 | 2.0 | 2.0 | — |
| Diethylene glycol monobutylether | — | — | — | — | — | 2.0 |
| Surfynol 440 (acetylene glycol-based) | 0.6 | 0.5 | 0.2 | — | 1.2 | 1.2 |
| BYK-345 (silicone-based) | — | — | — | 1.2 | — | — |
| SUPERFLEX ® 420NS (urethane-based resin, solid portion) | 1.5 | 1.5 | 1.5 | 1.5 | 1.5 | 1.5 |
| Deionized water | *Ba | *Ba | *Ba | *Ba | *Ba | *Ba |
| Total (parts) | 100 | 100 | 100 | 100 | 100 | 100 |
| Static surface tension (mN/m) | 29.6 | 29.7 | 30.5 | 28.7 | 28.4 | 29.4 |

TABLE 3

| | Yellow ink No. | | | | | | | | |
|---|---|---|---|---|---|---|---|---|---|
| | 1 | 2 | 3 | 4 | 5 | 6 | 7 | 8 | 9 |
| Yellow pigment dispersion | 40.0 | 40.0 | 40.0 | 40.0 | 40.0 | 40.0 | 40.0 | 40.0 | 40.0 |
| Glycerin | 15.0 | 15.0 | 15.0 | 15.0 | 15.0 | 15.0 | 15.0 | 15.0 | 15.0 |
| 2-pyrroridone | 5.0 | 5.0 | 5.0 | 5.0 | 5.0 | 5.0 | 5.0 | 5.0 | 5.0 |
| 1,2-hexane diol | 3.0 | 3.0 | 3.0 | 3.0 | — | — | 3.0 | 3.0 | 5.5 |
| 4-methyl-1,2-pentanediol | — | — | — | — | — | 3.0 | — | — | — |
| Triethylene glycol monobutylether | 2.0 | 2.0 | 2.0 | 2.0 | 2.0 | 2.0 | — | 4.5 | 2.0 |
| Diethylene glycol monobutylether | — | — | — | — | — | — | 2.0 | — | — |
| Surfynol 440 (acetylene glycol-based) | 1.7 | 1.3 | 1.0 | 0.7 | — | 1.7 | 1.7 | 2.2 | 2.0 |
| BYK-345 (silicone-based) | — | — | — | — | 1.7 | — | — | — | — |
| SUPERFLEX ® 420NS (urethane-based resin, solid portion) | 1.5 | 1.5 | 1.5 | 1.5 | 1.5 | 1.5 | 1.5 | 1.5 | 1.5 |
| Deionized water | *Ba | *Ba | *Ba | *Ba | *Ba | *Ba | *Ba | *Ba | *Ba |
| Total (parts) | 100 | 100 | 100 | 100 | 100 | 100 | 100 | 100 | 100 |

Examples 1 to 16 and Comparative Examples 1 to 4

The black inks and the yellow inks shown in Table 4 were combined to prepare ink sets. Each ink set was evaluated in the following manner and the results are shown in Table 4.

Ink Discharging Property 1: Evaluation on Discharging Stability (1) Using a line head type inkjet printer illustrated in FIG. 3 and FIG. 4 having an inkjet head having the nozzle surface illustrated in FIG. 9 and having the nozzle illustrated in FIG. 7 having a cylindrical portion having a length of 30 μm along the axial direction, a solid image of 1200 dpi×1200 dpi was printed on ten recording media (A4 size, MyPaper, manufactured by Ricoh Co., Ltd.) at 25 degrees C. using each ink set shown in Table 4.

(2) Using the wiping device illustrated in FIG. 5, the nozzle surface of the inkjet head was wiped with a non-woven fabric (clean wiper, Anticon® GOLD, polyester long fiber, available from Harada Corporation) in the direction from the nozzle array through which the black ink is discharged to the nozzle array through which the yellow ink is discharged.

Next, one solid image was printed again under the same conditions, and the discharging stability was evaluated according to the following criteria. Discharging disturbance means a failure such as bending discharging excluding non-discharging. Grade B or higher is practically acceptable and grade A is preferable.

Evaluation Criteria
A: No discharging disturbance
B: Discharging disturbance at three or less nozzles
C: Discharging disturbance at more than three nozzles Ink Discharging Property 2: Evaluation on Recoverability (1) Using a line head type ink jet printer illustrated in FIG. 3 and FIG. 4 having an ink jet head having the nozzle surface illustrated in FIG. 9 and having the nozzle illustrated in FIG. 7 having a cylindrical portion having a length of 30 μm along the axial direction, a solid image of 1200 dpi×1200 dpi was printed on ten recording media (A4 size, MyPaper, manufactured by Ricoh Co., Ltd.) at 25 degrees C. using each ink set shown in Table 4. Image density of the tenth recording medium was measured using a spectral densitometer (X-Rite 939, manufactured by X-Rite Inc.) and determined as the reference density.

(2) Using the wiping device illustrated in FIG. 5, the nozzle surface of the inkjet head was wiped with a non-woven fabric (clean wiper, Anticon® GOLD, polyester long fiber, available from Harada Corporation) in the direction from the nozzle array through which the black ink is discharged to the nozzle array through which the yellow ink is discharged.

(3) The solid image was printed on a recording medium under the same conditions after idle discharging (total amount of waste ink of 10,000 pL) once, and the image density was measured with a spectral densitometer (X-Rite 939, manufactured by X-Rite Co., Ltd.) and determined as the measuring density, which was thereafter compared with the reference density.

The steps (1) to (3) described above are repeated by increasing the number of idle discharging operations in (3) one by one to obtain the number of idle discharging operations required when the density difference became 0.05 or less to evaluate the recoverability according to the following criteria. Grade C or higher is practically acceptable. Grade B or higher is effective as the present disclosure and grade A is preferable.

Evaluation Criteria

A: Recovered by idle discharging once
B: Recovered by idle discharging twice
C: Recovered by idle discharging three or more times
D: Not recovered In Example 16 and Comparative Example 2, the inkjet head was used having a cylindrical portion having the same diameter as the discharging opening diameter of the nozzle which has a length of 25 μm along the axial direction and, in Comparative Example 4, the inkjet head was used having a cylindrical portion having the same diameter as the discharging opening diameter of the nozzle which has a length of 20 μm along the axial direction was used to evaluate discharging stability and recoverability.

TABLE 4

| | Black ink No. | Yellow ink No. | Surface tension difference (static surface tension A − static surface tension B) (mN/m) | Discharging stability | Recoverability |
|---|---|---|---|---|---|
| Example 1 | 3 | 1 | 0.6 | A | B |
| Example 2 | 4 | 1 | 0.7 | A | A |
| Example 3 | 5 | 1 | 0.8 | A | A |
| Example 4 | 6 | 1 | 1.0 | A | A |
| Example 5 | 7 | 1 | 1.2 | B | A |
| Example 6 | 4 | 8 | 0.7 | B | A |
| Example 7 | 4 | 9 | 0.7 | B | A |
| Example 8 | 11 | 5 | 0.7 | A | A |
| Example 9 | 12 | 6 | 0.7 | A | A |
| Example 10 | 13 | 7 | 0.7 | A | A |
| Example 11 | 8 | 7 | 0.9 | B | A |
| Example 12 | 4 | 5 | 0.7 | B | A |
| Example 13 | 8 | 3 | 0.6 | A | B |
| Example 14 | 9 | 3 | 0.7 | A | A |
| Example 15 | 10 | 4 | 1.0 | A | A |
| Example 16 | 4 | 1 | 0.7 | B | A |
| Comparative Example 1 | 2 | 1 | 0.2 | A | C |
| Comparative Example 2 | 2 | 1 | 0.2 | B | C |
| Comparative Example 3 | 1 | 2 | −0.6 | A | C |
| Comparative Example 4 | 2 | 1 | 0.2 | C | A |

Aspects of the present disclosure are, for example, as follows.

1. An ink set comprises black ink having a static surface tension A and yellow ink having a static surface tension B, wherein the static surface tension A is by 0.6 mN/m or more greater than the static surface tension B, wherein the ink set is used in an image forming device including an inkjet head including a nozzle plate including a first nozzle array and a second nozzle array disposed adjacent to the first nozzle array, the first nozzle array including multiple first nozzles configured to discharge the black ink and a second nozzle array including multiple second nozzles configured to discharge the yellow ink, wherein each nozzle of the multiple first nozzles and the multiple second nozzles has a cylindrical portion having a length of 25 μm or longer along an axial direction with an opening on an ink discharging side of the nozzle plate.

2. The ink set according to 1 mentioned above, wherein the length is 30 μm or longer.

3. The ink set according to 1 or 2 mentioned above, wherein the nozzle plate further includes respective first introduction portions configured to communicate with the multiple first nozzles and respective second introduction portions configured to communicate with the multiple second nozzles, wherein the diameter of the respective first introduction portion is larger than the diameter of the multiple first nozzles and the diameter of the respective second introduction portions is larger than the diameter of the multiple second nozzles.

4. The ink set according to any one of 1 to 3 mentioned above, wherein the static surface tension A is by 0.7 mN/m or more greater than the static surface tension B.

5. The ink set according to any one of 1 to 4 mentioned above, wherein the following inequality is satisfied:

$$0.7 \text{ mN/m} \leq (\text{the static surface tension } A) - (\text{the static surface tension } B) \leq 1.0 \text{ mN/m}.$$

6. The ink set according to any one of 1 to 5 mentioned above, wherein each of the black ink and the yellow ink comprises an acetylene glycol compound, triethylene glycol monobutyl ether, and glycerin, wherein the following inequalities are satisfied:

$$|(\text{proportion of the acetylene glycol compound in the black ink}) - (\text{proportion of the acetylene glycol compound in the yellow ink})| \leq 2 \text{ percent by mass},$$

$$|(\text{proportion of triethylene glycol monobutyl ether in the black ink}) - (\text{proportion of triethylene glycol monobutyl ether in the yellow ink})| \leq 2 \text{ percent by mass},$$

$$|(\text{proportion of glycerin in the black ink}) - (\text{proportion of glycerin in the yellow ink})| \leq 2 \text{ percent by mass}.$$

7. The ink set according to any one of 1 to 6 mentioned above, wherein the ink head is a line-type inkjet head.

8. An image forming device includes black ink having a static surface tension A and yellow ink having a static surface tension B, and an inkjet head including a nozzle plate including a first nozzle array and a second nozzle array disposed adjacent to the first nozzle array, the first nozzle array including multiple first nozzles configured to discharge the black ink, and a second nozzle array including multiple second nozzles configured to discharge the yellow ink, wherein each nozzle of the multiple first nozzles and the multiple second nozzles having a cylindrical portion having a length of 25 μm or longer along an axial direction, wherein the static surface tension A is by 0.6 mN/m or more greater than the static surface tension B.

9. The image forming device according to 8 mentioned above, wherein the length is 30 μm or longer.

10. The image forming device according to 8 or 9 mentioned above, wherein the nozzle plate further includes respective first introduction portions configured to communicate with the multiple first nozzles and respective second introduction portions configured to communicate with the multiple second nozzles, wherein the diameter of the respective first introduction portion is larger than the diameter of the multiple first nozzles and diameter of the respective second introduction portions is larger than the diameter of the multiple second nozzles.

11. The image forming device according to any one of 8 to 10 mentioned above, wherein the static surface tension A is by 0.7 mN/m or more greater than the static surface tension B.

12. The image forming device according to any one of 8 to 11 mentioned above, wherein the following inequality is satisfied:

0.7 mN/m≤(the static surface tension $A$)−(the static surface tension $B$)≤1.0 mN/m.

13. The image forming method according to any one of 8 to 12 mentioned above, wherein each of the black ink and the yellow ink comprises an acetylene glycol compound, triethylene glycol monobutyl ether, and glycerin, wherein the following inequalities are satisfied:

|(proportion of the acetylene glycol compound in the black ink)−(proportion of the acetylene glycol compound in the yellow ink)|≤2 percent by mass,

|(proportion of triethylene glycol monobutyl ether in the black ink)−(proportion of triethylene glycol monobutyl ether in the yellow ink)|≤2 percent by mass,

|(proportion of glycerin in the black ink)−(proportion of glycerin in the yellow ink)|≤2 percent by mass.

14. The image forming device according to any one of 8 to 13 mentioned above, wherein the ink head is a line-type inkjet head.

15. An ink set comprises dark color ink having a static surface tension A and light color ink having a static surface tension B, wherein the static surface tension A is by 0.6 mN/m or more greater than the static surface tension B, wherein the ink set is used in an image forming device including an inkjet head including a nozzle plate including a first nozzle array and a second nozzle array disposed adjacent to the first nozzle array, the first nozzle array including multiple first nozzles configured to discharge the dark color ink and a second nozzle array including multiple second nozzles configured to discharge the light color ink wherein each nozzle of the multiple first nozzles and the multiple second nozzles has a cylindrical portion having a length of 25 μm or longer along an axial direction with an opening on an ink discharging side of the nozzle plate.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink set comprising:
   black ink having a static surface tension A; and
   yellow ink having a static surface tension B,
   wherein the static surface tension A is by 0.6 mN/m or more greater than the static surface tension B,
   wherein the ink set is used in an image forming device including an inkjet head including a nozzle plate including a first nozzle array and a second nozzle array disposed adjacent to the first nozzle array, the first nozzle array including multiple first nozzles configured to discharge the black ink and a second nozzle array including multiple second nozzles configured to discharge the yellow ink,
   wherein each nozzle of the multiple first nozzles and the multiple second nozzles has a cylindrical portion having a length of 25 μm or longer along an axial direction with an opening on an ink discharging side of the nozzle plate.

2. The ink set according to claim 1, wherein the length is 30 μm or longer.

3. The ink set according to claim 1,
   wherein the nozzle plate further includes respective first introduction portions configured to communicate with the multiple first nozzles and respective second introduction portions configured to communicate with the multiple second nozzles,
   wherein a diameter of the respective first introduction portions is larger than a diameter of the multiple first nozzles and a diameter of the respective second introduction portions is larger than a diameter of the multiple second nozzles.

4. The ink set according to claim 1,
   wherein the static surface tension A is by 0.7 mN/m or more greater than the static surface tension B.

5. The ink set according to claim 1,
   wherein the following inequality is satisfied:

0.7 mN/m≤(the static surface tension $A$)−(the static surface tension $B$)≤1.0 mN/m.

6. The ink set according to claim 1,
   wherein each of the black ink and the yellow ink comprises an acetylene glycol compound, triethylene glycol monobutyl ether, and glycerin,
   wherein the following inequalities are satisfied:

|(proportion of the acetylene glycol compound in the black ink)−(proportion of the acetylene glycol compound in the yellow ink)|≤2 percent by mass,

|(proportion of triethylene glycol monobutyl ether in the black ink)−(proportion of triethylene glycol monobutyl ether in the yellow ink)|≤2 percent by mass,

|(proportion of glycerin in the black ink)−(proportion of glycerin in the yellow ink)|≤2 percent by mass.

7. The ink set according to claim 1, wherein the ink head comprises a line-type inkjet head.

8. An image forming device comprising:
   black ink having a static surface tension A;
   yellow ink having a static surface tension B; and
   an inkjet head including a nozzle plate including a first nozzle array and a second nozzle array disposed adjacent to the first nozzle array, the first nozzle array including multiple first nozzles configured to discharge the black ink and a second nozzle array including multiple second nozzles configured to discharge the yellow ink,
   wherein each nozzle of the multiple first nozzles and the multiple second nozzles has a cylindrical portion having a length of 25 μm or longer along an axial direction with an opening on an ink discharging side of the nozzle plate,
   wherein the static surface tension A is by 0.6 mN/m or more greater than the static surface tension B.

9. The image forming device according to claim 8, wherein the length is 30 μm or longer.

10. The image forming device according to claim 8,
    wherein the nozzle plate further includes respective first introduction portions configured to communicate with the multiple first nozzles and respective second introduction portions configured to communicate with the multiple second nozzles, wherein a diameter of the respective first introduction portions is larger than a diameter of the multiple first nozzles and a diameter of the respective second introduction portions is larger than a diameter of the multiple second nozzles.

11. The image forming device according to claim 8, wherein the static surface tension A is by 0.7 mN/m or more greater than the static surface tension B.

12. The image forming device according to claim 8, wherein the following inequality is satisfied:

0.7 mN/m≤(the static surface tension $A$)−(the static surface tension $B$)≤1.0 mN/m.

13. The image forming device according to claim 8, wherein each of the black ink and the yellow ink comprises an acetylene glycol compound, triethylene glycol monobutyl ether, and glycerin, wherein the following inequalities are satisfied:

|(proportion of the acetylene glycol compound in the black ink)−(proportion of the acetylene glycol compound in the yellow ink)|≤2 percent by mass,

|(proportion of triethylene glycol monobutyl ether in the black ink)−(proportion of triethylene glycol monobutyl ether in the yellow ink)|≤2 percent by mass,

|(proportion of glycerin in the black ink)−(proportion of glycerin in the yellow ink)|≤2 percent by mass.

14. The image forming device according to claim 8, wherein the ink head comprises a line-type inkjet head.

15. An ink set comprising:

dark color ink having a static surface tension A; and light color ink having a static surface tension B, wherein the static surface tension A is by 0.6 mN/m or more greater than the static surface tension B, wherein the ink set is used in an image forming device including an inkjet head including a nozzle plate including a first nozzle array and a second nozzle array disposed adjacent to the first nozzle array, the first nozzle array including multiple first nozzles configured to discharge the dark color ink and a second nozzle array including multiple second nozzles configured to discharge the light color ink wherein each nozzle of the multiple first nozzles and the multiple second nozzles has a cylindrical portion having a length of 25 μm or longer along an axial direction with an opening on an ink discharging side of the nozzle plate.

* * * * *